Patented Aug. 12, 1930

1,772,752

UNITED STATES PATENT OFFICE

JOHN McGAVACK, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT

TREATMENT OF LATEX

No Drawing.      Application filed March 27, 1929. Serial No. 350,457.

This invention relates to an improved method of concentrating and/or purifying latex of rubber or similar material, and particularly to a method wherein latex can be creamed with a minimum loss of total solids, and also with a reduction in the cost of creaming.

In creaming latex with a creaming agent, of which there are quite a number, the more prominent ones being Irish moss, Karaya gum, tragacanth gum, pectin, pectin allied bodies, ammonium alginate etc., the considerations in practice such as convenience, cost of creaming agent, amount of creaming agent used, production of the best type of useable cream, will depend a great deal on the type of creaming agent employed. The usual practice however is to add a small amount of the creaming agent in dilute solution to latex, then dilute the whole mass to about 32–36% solids and allow the same to separate; remove the lower layer and utilize the cream in any desired manner. In this way there is removed from the latex cream a good proportion of non-rubber solids, in the form of serum soluble solids. Again with a given latex and creaming agent, for the same results, the same amount of creaming agent is necessary.

Accordingly this invention aims to provide a method wherein latex may be creamed in a manner designated to retain with the cream portion an increased amount of total solids. A further aim is to provide a method wherein substantially the same degree of creaming may be attained with the use of a decreased amount of creaming agent, thereby reducing the cost of operation.

Broadly the invention comprises creaming latex with any creaming agent, re-introducing into another or successive fresh portion of uncreamed latex a portion of the materials separated from the preceding creamed latex in the form of serum and then either prior thereto, at the same time, or immediately thereafter, adding to the uncreamed latex the same, or a reduced, proportion of creaming agent to bring about another or successive creaming operation. More briefly normal latex, that is, latex such as is normally shipped into this country, (40–42% total solids) is diluted to 36% solids, or better still, 30–32% solids. After the addition of creaming agent, the resulting mixture is to be adjusted by dilution to about 32% solids. The next step is to take a portion of the serum, that separates, dissolve the proper amount of creaming agent therein, and add this to a second quantity of latex and allow the same to cream. If half of the serum is used as dilutent then half of the serum solids from the first creaming is introduced into the second bath of latex. After the creaming, the serum from the second bath is used to dissolve the creaming agent for the third bath and so on. As the number of creamings gradually increase so the loss in the solid content of each new latex is gradually diminished. In this manner the loss of serum solids is reduced from about 6% to 2–3% with no further addition or expense. Of course, if desired, the serum from one creaming may be used to dilute the next fresh portion of latex, in concentrated form, as where the serum is concentrated by heat or vacuum evaporation.

When the saving of stated proportion of total solids, to the cream, is not desired, but in lieu thereof a cream containing about 92–93% of the original solids in the latex, at a reduced cost, it is only necessary to cut down the amount of creaming agent added at the second and successive creaming operations to about one-half of the original amount first used, and use only so much of the serum as is necessary to dilute the uncreamed latex portions to a solids concentratiton of about 30–32%. This second result probably depends on two facts; that there is still good creaming agent in the serum and furthermore that there are solids added instead of simply water during the dilution of the latex.

Although particular embodiments are given, it is with the understanding that these are to be regarded in the light of examples and not as limitations. Example 1 illustrates how to reduce the waste serum solids and Example 2 how to reduce the cost of creaming.

*Example 1.*—To 500 grams of latex (approximately 40% solids) is added .2 parts of ammonium alginate per 100 parts of solids and then the latex is diluted to about 30% solids. This is allowed to cream; the serum is separated at the end of 24 hours and to a fresh 500 grams of latex is added .2 parts of ammonium alginate per 100 parts of solids, diluting the ammonium alginate with sufficient of the previous serum to bring the concentration of the latex down to about 30% solids. After about 24 hours creaming, the serum is separated from the cream. A fresh portion of latex is treated with this second serum and an additional .2 parts of alginate in the same manner as the second fresh portion of latex was treated. Successive operations are carried out in the same manner as the last mentioned one. After about the fifth operation, the resultant solids concentration of the latex cream shows a fairly constant value which is about 98% of the original solids started with, instead of about 92% as in the case where the invention is not applied. The following table shows the results in terms of grams.

|  | Grams. |
|---|---|
| Weight of original solids in latex | 193 |
| Weight after first creaming | 179.5 |
| Weight after second creaming | 183 |
| Weight after third creaming | 186 |
| Weight after fourth creaming | 189 |

*Example 2.*—To 500 grams of latex (about 40% solids) is added .2 part of ammonium alginate per 100 parts of solids and then diluted to about 30% solids concentration. This is allowed to cream and separated serum together with .1 part of ammonium alginate per 100 parts of solids is added to a fresh portion of latex, in amount sufficient to bring the solid concentration down to about 30%. This last operation is repeated four or five times. The result is a cream containing about 92% of the original solids at half the price of the original creaming agent. In other words this allows one to cream to substantially the same degree, and the same extent from the standpoint of non-rubber solids as is done at present, at practically half the cost.

With the detailed disclosure above given, it is obvious that modifications will suggest themselves and it is not desired to limit the invention otherwise than as set forth in the appended claims.

Having thus described my invention, what I claim and desire to protect by Letters Patent is:

1. In a method of creaming latex, the step of diluting a portion of latex to be creamed, with serum derived from a preceding latex creaming operation.

2. A method of creaming latex which comprises creaming a portion of latex with the addition of a creaming agent, separating the serum layer therefrom, adding to a fresh portion of latex separated serum and creaming agent, allowing the last mentioned latex to cream and removing the latex cream.

3. A method of creaming latex which comprises creaming a portion of latex with the addition of a creaming agent, separating the serum layer therefrom, adding to a fresh portion of latex separated serum and creaming agent, allowing the last mentioned latex to cream, removing the latex cream, and repeating the creaming operation upon successive fresh portions of latex with the aid of serum as a diluent.

4. A method, as specified in claim 3, comprising repeating the creaming operation with the aid of serum as a diluent until a substantially constant value of total solids concentration in the latex cream is obtained.

5. A method as specified in claim 3 in which the amount of creaming agent that is used with the serum as a diluent is less than that first used.

6. A method of creaming latex which comprises creaming a portion of latex with the addition of a creaming agent, separating the serum layer therefrom, adding to a fresh portion of latex an amount of the separated serum in concentrated form and a creaming agent, allowing the last mentioned latex to cream and removing the latex cream.

7. A method of creaming latex which comprises creaming a portion of latex with the addition of ammonium alginate, separating the serum layer therefrom, adding to a fresh portion of latex separated serum and ammonium alginate, allowing the last mentioned latex to cream and removing the latex cream.

8. A method of creaming latex which comprises creaming a portion of latex with the addition of ammonium alginate, separating the serum layer therefrom, adding to a fresh portion of latex separated serum and ammonium alginate, allowing the last mentioned latex to cream, removing the latex cream, and repeating the creaming operation upon successive fresh portions of latex with the aid of serum as a diluent.

9. A method, as specified in claim 8, comprising repeating the creaming operation with the aid of serum as a diluent until a substantially constant value of total solids concentration in the latex cream is obtained.

10. A method as specified in claim 8 in which the amount of ammonium alginate that is used with the serum as a diluent is less than that first used.

11. A method of creaming latex which comprises creaming a portion of latex with the addition of ammonium alginate, separating the serum layer therefrom, adding to a fresh portion of latex an amount of the separated serum in concentrated form and ammonium alginate, allowing the last mentioned latex to cream and removing the latex cream.

12. A method of creaming latex which comprises diluting latex to a solids concentration of about 30-32% and adding ammonium alginate, allowing the latex to cream, using separated serum thereof to dilute a fresh portion of latex to about 30-32% solids concentration and creaming the same with ammonium alginate, and then removing the latex cream.

13. A method of creaming latex which comprises diluting latex to a solids concentration of about 30-32% and adding ammonium alginate, allowing the latex to cream, using separated serum thereof to dilute a fresh portion of latex to about 30-32% solids concentration and creaming the same with ammonium alginate, then removing the latex cream and repeating the ammonium alginate creaming operation upon successive fresh portions of latex with serum as a diluent.

14. A method as specified in claim 13 comprising repeating the ammonium alginate creaming operation with serum as a diluent until a substantially constant value of total solids concentration in the latex is obtained.

15. A method as specified in claim 13 in which the amount of ammonium alginate that is used with the serum as a diluent is less than that first used.

Signed at Passaic, county of Passaic, State of New Jersey, this 21st day of March, 1929.

JOHN McGAVACK.